Sept. 2, 1958  W. S. BLUNDIN  2,850,183
FEEDER FOR FIBROUS MATERIALS
Filed Jan. 2, 1953
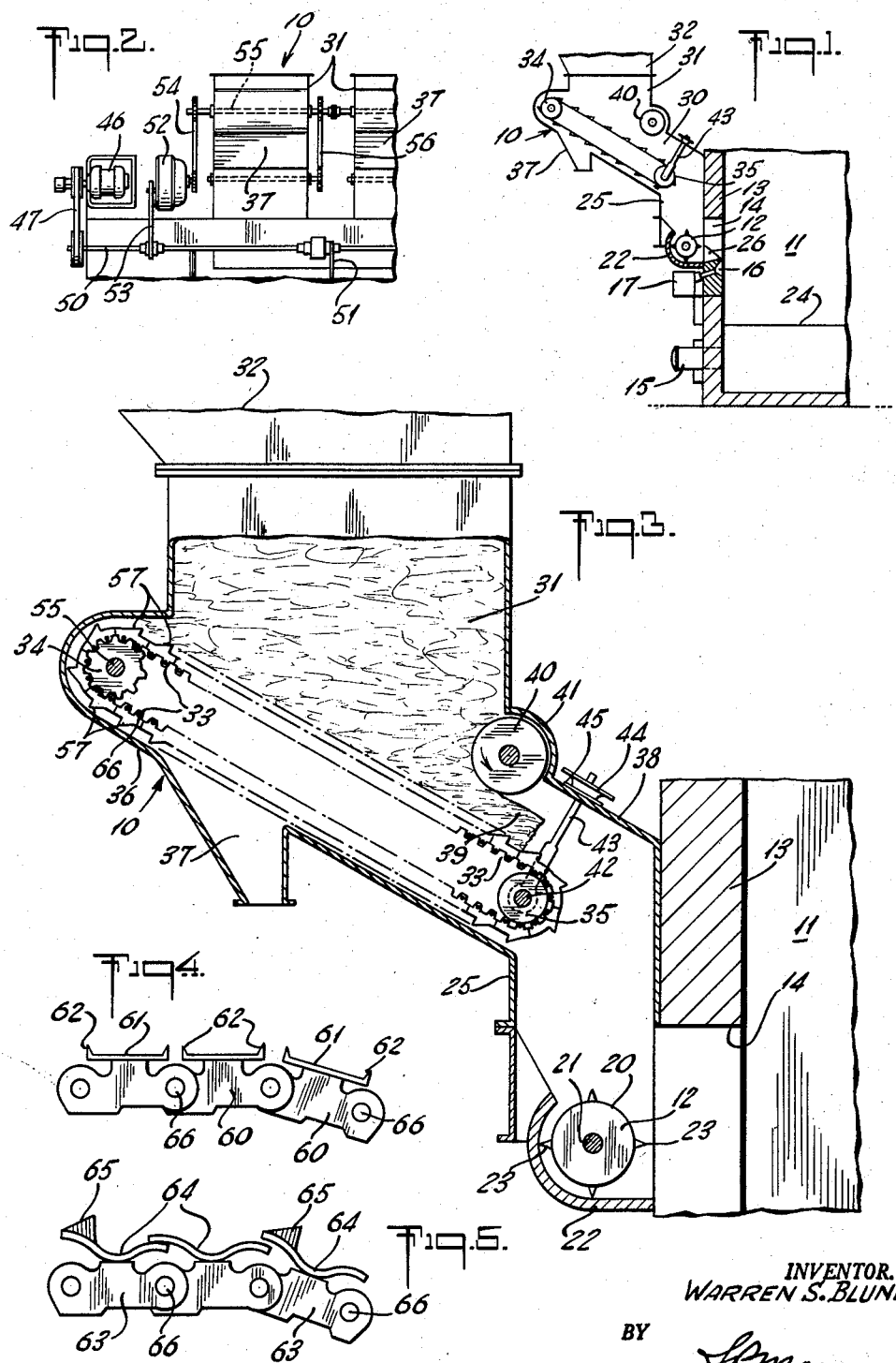
INVENTOR.
WARREN S. BLUNDIN
BY
ATTORNEY United States Patent Office 2,850,183
Patented Sept. 2, 1958

2,850,183

FEEDER FOR FIBROUS MATERIALS

Warren S. Blundin, North Plainfield, N. J., assignor to The Babcock & Wilcox Company, New York, N. Y., a corporation of New Jersey Application January 2, 1953, Serial No. 329,383

3 Claims. (Cl. 214—18)

The present invention relates to feeding means for the controlled delivery of waste process materials to a furnace, and more particularly to an inclined chain feeder for the delivery of bagasse to a furnace.

The waste materials from many commercial processes are burned to dispose of the materials and to produce heat which can be economically used in the process or to produce power. The process of producing sugar from sugar cane is a typical commercial process where the waste materials produced therein i. e. bagasse, can be economically burned. Bagasse has a low heat value and a high moisture content when compared with commercial solid or liquid fuels, such as coal or fuel oil. Moreover, the bagasse is fibrous, and with its high moisture content is particularly difficult to feed with the desired degree of uniformity.

According to my invention, I provide a feeder which is provided with an endless moving chain, or the like, having a plurality of spaced upstanding fingers or spikes projecting outwardly of the endless chain and intended to positively feed controlled amounts of a mass of bagasse resting thereon. The feeder is driven at a controlled speed so as to regulate the bagasse delivery rate, with changes in the lineal speed of the endless chain proportionately changing the rate of bagasse delivery. Preferably, the feeder is inclined downwardly toward its discharge end with the bagasse falling by gravity to a lower distributing means for introduction into a furnace. Advantageously, the feeder cooperates with the mass of bagasse resting thereon to serve as a seal to prevent infiltration of air to, or exfiltration of furnace gases from the furnace.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described an embodiment of the invention.

Of the drawings:

Fig. 1 is an elevation, in section, of the feeder of the present invention as applied to a furnace;

Fig. 2 is an end view of the apparatus shown in Fig. 1;

Fig. 3 is an enlarged elevation, in section, of the feeder shown in Fig. 1;

Fig. 4 is a side view of a section of modified chain suitable for use in the feeder shown in Fig. 3; and Fig. 5 is a side view of a section of modified chain construction.

In the illustrated embodiment of the invention, the feeder 10 is positioned adjacent a wall of a bagasse burning furnace 11 intermediate a source of bagasse and a rotatable mechanical distributor 12. The feeder is driven by a variable speed drive mechanism to regulate the amount of bagasse discharged to the distributor and thereafter introduced to the furnace.

As shown in Fig. 1, the furnace 11 is defined by refractory walls 13, with one upright wall provided with a port 14 for the introduction a fuel therethrough. An ash door 15 is located in the lower portion of the wall beneath the port 14, for access to the furnace 11 and the removal of incombustible fuel residue. The fuel introduced through the port 14 by the distributor 12 is intersected by streams of combustion air which are injected through jet nozzles 16 from an air distributing manifold 17. The nozzles 16 are inclined upwardly toward the furnace to discharge substantially immediately below the lower edge of the port 14. The distributor 12 (see Fig. 3) consists of a cylindrical drum 20 which is rotatable on a horizontal axle 21 which is journaled into the side walls of the distributor housing 22. The external surface of the drum 20 is provided with a plurality of radially extending vanes 23 so that with high speed rotation of the drum and the gravitation delivery of bagasse thereto from the feeder of the invention the fuel is thrown into the furnace 11 to burn partially in suspension and partially on a grate, indicated at 24 in Fig. 1, in the lower portion of the furnace. As shown in Fig. 1, a water-cooled metallic member 26 is positioned in the lower portion of the port 12 with the upper surface thereof sloping downwardly toward the inner surface of the wall from a position substantially in horizontal alignment with the axis of the drum 20.

The housing 22 is mounted on the exterior of the furnace wall to enclose the distributor 12 and is provided with a top opening connected in air tight relationship with a down spout 25 from the feeder 10.

The feeder 10 is mounted adjacent the furnace wall 13 above the distributor 12 in an air tight enclosure 30 having an upper inlet spout 31 opening to an overhead storage or surge bin 32 which is supplied with bagasse by a conveyor or the like (not shown). The spout 31 has upright parallel walls transversely spaced for unrestricted flow of bagasse downwardly to the feeder. The feeder consists of an endless belt or chain 33 supported and operated by spaced rotatable members whereby the upper surface of the feeder moves toward the feeder discharge spout 25. In the illustrated embodiment of the invention the feeder chain 33 is inclined downwardly toward the furnace at an angle of approximately 30° and the rotating members consist of an upper driving sprocket 34 and a lower idler drum 35. The sprocket 34 and drum 35 are spaced beyond the vertical projections of the walls of the spout 31 and the width of the feeder is greater than the width of the spout so that the moving surface of the feeder is greater than the cross-sectional area of the spout 31.

The enclosure 30 includes a bottom plate 36 welded to the outer wall of the spout 31 and curved to generally follow the configuration of the feeder to a lower attachment with the outer wall of the spout 25. A hopper 37 is located in the plate 36 to collect any siftings which may accumulate in the lower part of the enclosure along the return run of the chain 33. The hopper 37 is periodically emptied as required, and is ordinarily closed to avoid gas leakage therethrough.

A top plate 38 is attached at its lower edge to the upper end of the spout 25 side adjoining the wall of the furnace. The plate 38 is parallel to the lower end portion of the plate 36, and at its upper end is spaced from the adjacent side of the spout 31 for the installation of a drum 40. Alternately, the plate may be welded to the spout 31 to form a rounded or square juncture between the plate 38 and the spout 31. However, the drum 40 is of advantage in reducing frictional resistance to movement of material through the discharge throat 39 formed between the chain 33 and the intersection of the plate 38 and the spout 31. A curved plate 41 connects the plate 38 and the spout 31 outwardly of and spaced from the drum 40.

The axle 42 carrying the drum 35 is adjustably mounted whereby the spacing between the plate 38 and the discharge end of the endless chain 33 can be changed, within the limits of the closure. This is accomplished by means of a pair of threaded shanks 43 which are attached to the outboard bearings supporting the axle 42 and extending upwardly through an opening in the plate 38. A wing nut 44, or the like, engages the outer end portion of the shank and rests upon a washer 45 to maintain the closure substantially gas tight.

As shown in Fig. 2, the feeder 10 and the distributor 12 are driven from a common power source. In the usual installation of the feeder of the present invention a plurality of distributor and feeder assemblies are used for the controlled delivery of fuel to the furnace. It will, of course, be understood that in certain instances a single assembly could be used for a low fuel capacity installation. When multiple assemblies are used, as shown, a prime mover such as an electric motor 46 is connected by a V-belt or chain drive 47 with a main drive shaft 50. The shaft 50 is positioned on the exterior side of the furnace, and is connected with the axle 21 of the distributor 12 through a chain drive 51. Since the rotational speed of the distributor 12 is many times greater than the speed of the feeder, the drive shaft 50 is connected through a variable-speed reducer 52 by a chain drive 53. The output shaft of the reducer 52 is connected by a drive chain 54 with the shaft 55 of the sprocket 34 with an extension of the shaft 55 coupled to the corresponding shaft of the adjacent feeder. In the embodiment shown the axle 42 is also positively driven by a drive chain 56 from the shaft 55, although the drum 35 need not be positively driven in all instances.

The links of the chain 33 are advantageously provided with upstanding spikes or fingers 57 which project outwardly of the endless chain. The fingers are each of the same transverse width as the links in the chain, and when multiple strands of links are used to form the chain, the links are staggered transversely of the chain. With such projections the movement of the chain feeder undercuts the body of bagasse resting on the feeder to insure positive movement of the material downwardly in controlled amounts to the distributor and thence to the furnace. The fibers in the bagasse would ordinarily tend to matt and jam in a feeder, and result in either over or under feeding the fuel to the furnace in surges. With the fingers forming an integral part of the feeding surface, the projections engage the fibers and shred the mass sufficiently to maintain a generally uniform feed rate from the feeder which can be regulated in accordance with feeder speed and the height of the opening between the feeder surface and the plate 38.

In the embodiment of the endless chain 33 shown in Fig. 3 the fingers 57 are formed on each link of the chain. Each finger is of general trapezoidal vertical section with the leading edge thereof substantially normal to the surface of the feeder when the chain is driven in the direction described. Alternately, standard chain constructions can be used with good effect in feeding bagasse. As shown in Fig. 4, the chain link 60 can be of the type having its upper surface provided with an individual channel plate 61 attached thereto. With this type of chain two spikes or fingers 62 are provided on each link. In the chain link illustrated in Fig. 5, each link 63 is provided with a carrier cover plate 64 which is shaped to overlap the adjacent cover plate on the adjoining link in the chain. Preferably, fingers 65 are welded to the cover plates 64 to aid in feeding the bagasse. The fingers 65 are formed from triangular plates welded in staggered relationship on alternate links. The fingers 65 are cut from steel plate of, for example, ½ inch thickness, and spaced transversely of the chain.

The completed chain may be assembled with pins 66 extending the full width of the feeder, or the chain may be assembled as a series of endless strands arranged in side by side relationship or transversely separated by stationary plate strips. The assembly selected will depend upon the transverse width of the feeder.

In operation, the feeder will effectively deliver a substantially uniform stream of fibrous wet material, such as bagasse, with the delivery rate regulated by the speed of the feeder and the spacing between the discharge end of the chain and the plate 38. The upstanding fingers 57 engage the fibers in the mass of material resting on the feeder, undercutting the mass for positive delivery of material.

While in accordance with the provisions of the statutes I have illustrated and described herein the best form of the invention, and its mode of construction now known to me, those skilled in the art will understand that changes may be made in the form of the apparatus disclosed without departing from the spirit of the invention covered by the claims, and that certain features of the invention may sometimes be used to advantage without a corresponding use of the other features.

What is claimed is:

1. A feeder for the controlled delivery of wet fibrous materials comprising a housing having an inlet opening in the top, an inclined bottom plate of said housing having an outlet opening in the lower portion thereof, an overhead bin for said wet fibrous materials, an upright spout connecting said bin with the inlet opening of said housing, an endless chain positioned in said housing beneath said spout, a plurality of spaced fingers projecting outwardly of said chain, means for operatively supporting said endless chain in an inclined position with the lower end of said chain adjacent said outlet opening, a siftings hopper positioned below the inclined bottom plate of said housing, and drive means for moving the upper run of said endless chain downwardly to discharge said wet fibrous material through said discharge opening.

2. A bagasse feeder comprising a housing enclosing said feeder and having an upper inlet, an inclined bottom plate of said housing having an outlet in the lower portion thereof, an overhead bin for bagasse, an upright spout connecting said bin with said housing, an endless chain positioned in said housing beneath said spout, said endless chain defining a supporting surface for said bagasse, a plurality of spaced fingers projecting outwardly of said chain, sprockets at opposite ends of said chain in the lower portion of said housing, the sprockets positioned remote from the discharge end of said chain being at a higher level than the sprockets adjacent said discharge end whereby said chain is inclined downwardly with the bagasse fed by said endless chain discharging therefrom by gravity through said outlet, a vertically adjustable bearing mount for the lowermost of said sprockets supported from and adjustable relative to said houisng to change the inclination of said endless chain and the spacing between the discharge end of said chain and said housing, a siftings hopper positioned below the inclined bottom plate of said housing, and variable speed drive means connected with said sprockets.

3. A bagasse feeder comprising a housing enclosing said feeder and having an upper inlet opening, an inclined bottom plate of said housing having a discharge opening at the lower end thereof, an overhead bin for bagasse, an upright spout connecting said bin with the inlet opening of said housing, an endless chain, a plurality of spaced fingers projecting outwardly of said chain, sprocket means supporting said endless chain within said housing beneath said spout, the sprocket means positioned remote from said discharge opening being at a higher level than the sprocket means adjacent said opening whereby said chain is inclined downwardly toward the discharge opening with the bagasse fed by said endless chain discharging by gravity through said opening, a siftings hopper positioned below the inclined bottom plate of said housing, and drive means connected with said sprockets through a speed-reducer operable to drive said endless chain at a regulable speed.

References Cited in the file of this patent

UNITED STATES PATENTS

| | | |
|---|---|---|
| 688,780 | Haskard | Dec. 10, 1901 |
| 701,015 | Cowan | May 27, 1902 |
| 716,769 | Seaver | Dec. 23, 1902 |
| 748,539 | Snyder | Dec. 29, 1903 |
| 2,099,618 | Olney | Nov. 16, 1937 |
| 2,531,779 | Midgette et al. | Nov. 28, 1950 |

FOREIGN PATENTS

| | | |
|---|---|---|
| 52,270 | Norway | Mar. 6, 1933 |